United States Patent
Hattori et al.

(10) Patent No.: US 10,428,161 B2
(45) Date of Patent: Oct. 1, 2019

(54) METHOD FOR PRODUCING MODIFIED SOLUTION-POLYMERIZED DIENE RUBBER TO BE BLENDED WITH SILICA, AND RUBBER COMPOSITION CONTAINING SAME

(71) Applicant: ETIC Inc., Tokyo (JP)

(72) Inventors: Iwakazu Hattori, Tokyo (JP); Hisao Ono, Tokyo (JP)

(73) Assignee: ERIC Inc., Tokyo (JP)

( * ) Notice: Subject to any disclaimer, the term of this patent is extended or adjusted under 35 U.S.C. 154(b) by 0 days.

(21) Appl. No.: 15/760,703

(22) PCT Filed: Sep. 18, 2015

(86) PCT No.: PCT/JP2015/076805
§ 371 (c)(1),
(2) Date: Mar. 16, 2018

(87) PCT Pub. No.: WO2017/046963
PCT Pub. Date: Mar. 23, 2017

(65) Prior Publication Data
US 2018/0273650 A1    Sep. 27, 2018

(51) Int. Cl.
| | | |
|---|---|---|
| C08F 8/42 | (2006.01) | |
| C08C 2/06 | (2006.01) | |
| C08F 8/12 | (2006.01) | |
| C08K 3/04 | (2006.01) | |
| C08K 3/36 | (2006.01) | |
| C08L 15/00 | (2006.01) | |
| C08C 19/25 | (2006.01) | |
| C08F 236/10 | (2006.01) | |

(52) U.S. Cl.
CPC ............... *C08C 19/25* (2013.01); *C08C 2/06* (2013.01); *C08F 8/12* (2013.01); *C08F 8/42* (2013.01); *C08F 236/10* (2013.01); *C08K 3/04* (2013.01); *C08K 3/36* (2013.01); *C08L 15/00* (2013.01)

(58) Field of Classification Search
CPC ... C08C 19/25; C08C 2/06; C08F 8/12; C08F 8/42; C08F 236/10; C08K 3/04; C08K 3/36; C08L 15/00
USPC ........................................................ 524/572
See application file for complete search history.

(56) References Cited

U.S. PATENT DOCUMENTS

| | | |
|---|---|---|
| 5,128,416 A | 7/1992 | Imai et al. |
| 6,313,210 B1 | 11/2001 | Lin et al. |
| 6,344,518 B1 | 2/2002 | Kobayashi et al. |
| 6,602,942 B1 | 8/2003 | Karato |
| 2003/0100683 A1 | 5/2003 | Toyoizumi et al. |
| 2004/0152845 A1 | 8/2004 | Oshima et al. |
| 2004/0254301 A1 | 12/2004 | Tsukimawashi et al. |
| 2007/0088132 A1 | 4/2007 | Taniguchi et al. |
| 2007/0265397 A1 | 11/2007 | Shibata et al. |
| 2008/0103261 A1 | 5/2008 | Tanaka et al. |
| 2010/0006199 A1 | 1/2010 | Ohta et al. |
| 2013/0053472 A1 | 2/2013 | Hsieh et al. |

FOREIGN PATENT DOCUMENTS

| | | |
|---|---|---|
| EP | 1980575 | 10/2008 |
| EP | 2130841 | 12/2009 |
| JP | 59-038209 A | 3/1984 |
| JP | 62-227908 B1 | 10/1987 |
| JP | 63-168402 B1 | 7/1988 |
| JP | 63-175001 B1 | 7/1988 |
| JP | 01-284503 B2 | 11/1989 |
| JP | 2000-281835 A | 10/2000 |
| JP | 2003-246817 B2 | 9/2003 |
| JP | 2004-018795 A | 1/2004 |
| JP | 2004018795 A * | 1/2004 |
| JP | 2004-331940 B2 | 11/2004 |
| JP | 2006-257260 B2 | 9/2006 |
| JP | 2009-287018 A | 12/2009 |
| JP | 2013-053293 A | 3/2013 |
| RU | 2451693 | 5/2012 |
| RU | 2484104 | 6/2013 |
| WO | WO 2008/029814 A1 | 3/2008 |

OTHER PUBLICATIONS

PCT/JP2015/076805, Oct. 20, 2015, International Search Report and Written Opinion.

* cited by examiner

*Primary Examiner* — Kelechi C Egwim
(74) *Attorney, Agent, or Firm* — Wolf, Greenfield & Sacks, P.C.

(57) ABSTRACT

Studies have been made for the purpose of achieving both the improvement in the storage stability of a solution-polymerized diene rubber that is modified with an alkoxysilane compound and the improvement in the physical properties of the diene rubber when blended with silica. Thus, a production method whereby it becomes possible to produce a modified solution-polymerized diene rubber having good storage stability and high reactivity with silica is developed, by introducing several tens percent of a three blanched or four blanched component that has been coupled with a tin compound into a modified solution-polymerized diene rubber, then coagulating the resultant alkoxysilane modified diene rubber with steam and then drying the coagulated product. In addition, the physical properties of the rubber are further improved successfully by introducing a highly reactive structure to a polymerization initiation terminal of the rubber in the polymerization of the rubber using an alkyl lithium as a polymerization initiator.

9 Claims, No Drawings

METHOD FOR PRODUCING MODIFIED SOLUTION-POLYMERIZED DIENE RUBBER TO BE BLENDED WITH SILICA, AND RUBBER COMPOSITION CONTAINING SAME

RELATED APPLICATION

This application is a national stage filing under 35 U.S.C. 371 of International Patent Application Serial No. PCT/JP2015/076805, filed Sep. 18, 2015, entitled "METHOD FOR PRODUCING MODIFIED SOLUTION POLYMERIZED DIENE RUBBER TO BE BLENDED WITH SILICA, AND RUBBER COMPOSITION CONTAINING THE SAME." The contents of this application is incorporated herein by reference in its entirety.

TECHNICAL FIELD

The present invention relates to silica-loaded for terminal modified solution polymerized diene production process and a rubber composition of the rubber having physical properties such as excellent resilience and storage stability. The terminal modified solution polymerized diene rubber obtained by the production method, the higher the strength and rebound resilience, when used in a rubber tire, it is optimal for automotive tire having a good fuel efficiency.

BACKGROUND ART

Silica-containing rubber compositions are effective for making fuel efficiency tires. To improve tan δ of a rebound resilience test or a viscoelastic test, which is a laboratory indicator of fuel efficiency, alkoxysilane modified solution polymerization diene rubber with silica compound is effective. However, Si—OR groups contained in the modified solution polymerization diene rubber is hydrolyzed with moisture in the air, and further causes condensation reaction, and therefore problematic in that molecular weight increases during storage and the silica reactivity, which is indispensable for improving physical properties, decreases.

On the other hand, to improve the rebound resilience and the like, it is necessary to introduce a reactive functional group reacting with silicas such as alkoxysilyl group, to the molecule of the rubber at its one end. It has been considered that fuel efficiency is improved when another one end that is starting end was also modified, that is, both terminal-modified diene rubber is bonded to silica, the movement is suppressed by the bondings. However, in fact, it has also been found that when highly reactive functional group such as an alkoxysilyl group was introduced to the both ends, agglomerated silica cannot be efficiently dispersed by kneading.

Therefore, functional groups at one terminal that does not include an alkoxysilyl group is regarded as advantageous because silicas' interaction with the rubber is relatively low in kneading, and structures crosslinking with silica or other molecular structure easily during vulcanization reaction are believed to be advantageous, but there remains still many challenges in preparations of silica-containing modified solution polymerization diene rubber stable in industrial production and with good quality.

As shown in Patent Documents 1 and 2, the inventors disclosed for the first time the production method of solution polymerization diene rubber having an alkoxysilyl group by reacting, after polymerization of styrene and butadiene with alkyl lithium as a polymerization initiator, alkoxysilane compounds having large steric hindrance and hardly hydrolyzed, and started industrial production. However, it was found later that the alkoxysilane compound being lacking polar group containing N atom or the like, and modified diene rubber of this compound is somewhat low reactivity with silica.

Patent Document 3 discloses a production of modified SBR by reacting an amino alkoxysilane compound after polymerizing styrene and butadiene, alkyllithium as a polymerization initiator, and evaluation results of only carbon black compound.

Patent Document 4 discloses silica compound SBR of good storage stability, produced after the polymerization of styrene and butadiene, with alkyllithium as a polymerization initiator, by reacting in a specific proportion of amino alkoxysilane compounds similar to those in Patent Document 3.

Patent Document 5 discloses a synthesis of a coupling SBR by adding tin tetrachloride, after the polymerization of styrene and butadiene with lithium morpholide as a polymerization initiator, and results of evaluation of the physical properties of the product but of only the carbon black compounded ones.

Patent Document 6 discloses a production method of polymers, wherein the polymers are produced by reacting the amino alkoxy silane compound after a block copolymerization of styrene and butadiene, with an alkyl lithium or the like including an amino group but not added to the silica as a polymerization initiator, and further butadiene part is hydrogenated.

Patent Document 7 and Patent Document 8 disclose results of evaluation of properties of a polymer as silica formulation reacted by amino alkoxysilane compound after the polymerization of styrene and butadiene, the amino alkyl lithium being added and reacted with small amount of monomer and then used as initiator. However, the polymerization initiator has a special structure, and therefore it is difficult in industrial production to synthesize and to manufacture stably.

Patent Document 9 discloses a SBR carbon black formulation which was coupled with the halogenated tin compound after the polymerization of styrene and butadiene with alkyl lithium as a polymerization initiator, and prior to the reaction by the amino alkoxysilane compound, wherein the amount of said halogenated tin compound is half of the equivalent amount of the used alkyl lithium.

However, in recent years the demand for improvement of low fuel consumption of cars has become more and more stronger from the viewpoints of prevention of global warming and energy issues, and the like. Although silica compound tires are improved in fuel economy compared to the carbon black compound tires, suitable alkoxysilane-modified solution polymerization diene rubber composition containing silica has a problem that a Mooney viscosity (MV) is changed during storage, and the improvement request of further low fuel consumption has become stronger.

Patent Document 1: JPH06-51746(B1)
Patent Document 2: JPH07-68307(B1)
Patent Document 3: JPH06-53768(B1)
Patent Document 4: JP2013053293(A)
Patent Document 5: JPS59-38209(A)
Patent Document 6: JP 3988495(B2)
Patent Document 7: JP 4289111(B2)
Patent Document 8: JP4655706(B2)
Patent Document 9: JP 2625876(B2)

DISCLOSURE OF THE INVENTION

Problems to be Solved by the Invention

In such circumstances, an object of the present invention is to provide terminal modified solution diene rubber and a rubber composition thereof, wherein the rubber has a superior rebound resilience and the like, good steam desolvation, excellent storage stability of and excellent workability at the time of blending.

The Means to Solve the Problem

The present inventors have developed, by a result of intensive studies on manufacturing method of conjugated diene rubber having high rebound resilience and superior in storage stability, a manufacturing method of modified solution polymerization diene rubber, and completed the present invention. In the method, at first, a small amount of fast vulcanization rate monomer is polymerized in the presence of an organic lithium compound and secondary amine compound, followed by polymerization of other conjugated diene compound and an aromatic vinyl compound in a hydrocarbon. After the completion of the polymerization, a specific silane compound and a specific tin compound are added successively and specific coupling efficiency were controlled into certain ratio. Then, halogenated metal compounds are added under more specific conditions in the absence of an active diene rubber, followed by increasing of the coupling efficiency by steam coagulation. Resulted modified solution polymerization diene rubber was stable in productivity and storage stability was also good.

[1] A method for producing a modified solution polymerized diene rubber, comprising:
i) initiating polymerization of a conjugated diene compound and an aromatic vinyl compound in a hydrocarbon by an organolithium compound or in the co-presence of a secondary amine compound;
ii) after completion of the polymerization, adding a tin compound of formula (1) to treat the diene rubber so that the content of three or more branched component is 5 to 30%;
iii) adding the silane compound of formula (2), whereby the content of two-branched component of the diene rubber is less than 30%; and
iv) steam coagulating and drying the obtained polymer composition, so that the content of two or more branched component increases by 10 to 50% with respect to the state before steam coagulation, and wherein the modified solution polymerized diene rubber is thermally stabilized to the extent that the Mooney viscosity (a) of the rubber measured after said coagulation and drying, varies by not more than 10 from the Mooney viscosity (b) of the rubber measured when it is further heat-treated for 20 minutes with a subsequent 130° C. roll mill.

[Formula 1]

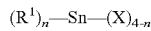
$(R^1)_n$—Sn—$(X)_{4-n}$         Formula (1)

wherein $R^1$ is an alkyl group, an allyl group or aromatic group, wherein a carbon number of $R^1$ is 1 to 12 carbon atoms, X is a halogen compound of iodine, bromine or chlorine, n is an integer of 0 or 1,

[Formula 2]

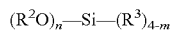
$(R^2O)_n$—Si—$(R^3)_{4-m}$         Formula (2)

wherein $R^2$ is an alkyl group, an allyl group or an aromatic group, wherein a carbon number of $R^2$ is 1 to 12, or an alkyl group, an aromatic group or an allyl group containing a nitrogen atom in these functional groups, $R^3$ is a an alkyl group, an allyl group or aromatic group, wherein a carbon number of $R^3$ is 1-12, or an alkyl group, an aromatic group or allyl group, containing an oxygen atom and/or a nitrogen atom in these functional groups, m is an integer of 2 to 4.

[2] The method for producing a modified solution polymerized diene rubber according to the above mentioned [1], wherein polymerization is initiated in the presence of an organolithium compound and a secondary amine compound.

[3] The method for producing a modified solution polymerized diene rubber according to the above mentioned [1] or [2], wherein, after preliminarily polymerizing isoprene with an organolithium compound, another conjugated diene compound and an aromatic vinyl compound are polymerized.

[4] The method for producing a modified solution polymerization diene rubber according to any one of the above mentioned [1] to [3], wherein another conjugated diene compound and the aromatic vinyl compound are polymerized after preliminary polymerization in the presence of an organolithium compound, a secondary amine compound, and isoprene.

[5] The method for producing a modified solution polymerized diene rubber according to any one of the above mentioned [1] to [4], wherein steam coagulation and drying in the step iv) is performed in such a way that the content of two or more branched component increases by 20 to 40% with respect to the state before the steam coagulation and drying

[6] The method for producing the modified solution polymerization diene rubber according to any one of the above mentioned [1], [3] and [5], wherein, after preliminarily polymerizing isoprene of not more than 10% by weight of the total monomers with an organolithium compound, another conjugated diene compound and the aromatic vinyl compound are polymerized.

[7] The method for producing the modified solution polymerized diene rubber according to any one of the above mentioned [1] to [6], wherein after step iii) and before step iv), addition of the metal halide compound of formula (3) in an amount satisfying the condition of formula (4) is done, and then the steam coagulation and drying of step iv) is performed.

[Formula 3]

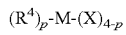
$(R^4)_p$-M-$(X)_{4-p}$         Formula (3)

wherein, M is a tin atom or a silicon atom, $R^4$ is an alkyl group or aromatic group, wherein a carbon number of $R^4$ is 1 to 12, or an allyl group or a carboxy group, X is a halogen compound of iodine, bromine or chlorine, p is an integer of 0 or 1.

[Formula 4]

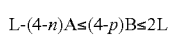
$L\text{-}(4\text{-}n)A \le (4\text{-}p)B \le 2L$         Formula (4)

wherein, L is the amount of moles of the organolithium compound added at the starting of the polymerization, A is the amount of moles of the added tin compound of formula (1), B is the added halogenated metal compound of formula (3), and n and p are integers shown in formulae (1) and (3), respectively.

[8] A rubber composition comprising silica of at least 20-150 phr for 100 phr of the total rubber component, wherein said 100 phr of the total rubber component contains at least 20 phr of the modified solution polymerized diene rubber according to any one of the above mentioned [1] to [7].

[9] A rubber composition comprising silica of at least 20-150 phr and carbon black of 5-30 phr for 100 phr of an entire rubber component, wherein said 100 phr of the total rubber component contains at least 20 phr of the modified solution polymerized diene rubber according to any one of the above mentioned [1] to [8].

That is, the first aspect of the present invention is, a method of manufacturing modified solution polymerization diene rubber comprising:

i) initiating polymerization of a conjugated diene compound and an aromatic vinyl compound in a hydrocarbon, by an organic lithium compound along or by coexisting organic lithium compound and secondary amine compound;

ii) after completion of the polymerization, treating to make the amount of the 3 or more branches of the components of the diene rubber is 5 to 30% by adding a tin compound represented by the formula (1); iii) then adding a silane compound represented by formula (2), and treat to make the amount of 2 branch component of the diene rubber is 30% or less; and iv) steam coagulating and drying the resulting polymer composition, so that the content of 2 or more branch components is increased by 10-50% with respect to the state before steam coagulation, whereas stabilized to the extent that the Mooney viscosity (a) of the rubber after steam coagulation and drying is different from the Mooney viscosity (b) of the rubber after further treatment of 130° C. roll mill for 20 minutes heat, by only 10 or less.

[Formula 1]

$$(R^1)_n\text{—Sn—}(X)_{4-n} \quad (1)$$

wherein, $R^1$ is an alkyl group, an allyl group or an aromatic group, wherein a carbon number of $R^1$ is 1-12, X is a halogen compound of iodine, bromine or chlorine, n is an integer of 0 or 1.

[Formula 2]

$$(R^2O)_m\text{—Si—}(R^3)_{4-m} \quad (2)$$

wherein, $R^2$ is an alkyl group, an allyl group or an aromatic group, wherein a carbon number of $R^2$ is 1-12, or an alkyl group, an aromatic group or an allyl group containing a nitrogen atom in these functional groups, $R^3$ is an alkyl group, an allyl group or an aromatic group, wherein a carbon number of $R^3$ is 1-12, or an alkyl group, an aromatic group or an allyl group containing an oxygen and/or nitrogen atom in these functional groups. m represents an integer of 2-4

The second aspect of the present invention relates to more optimal methods for manufacturing the modified solution polymerization diene rubber.

After aforementioned step iii) and before the step iv), the addition of the metal halide compound represented by the formula (3) satisfying the condition of formula (4) is done, and then the steam coagulation and drying of step iv) is done.

[Formula 3]

$$(R^4)_p\text{-M-}(X)_{4-p} \quad (3)$$

wherein, M is a tin atom or a silicon atom, $R^4$ is an alkyl group or an aromatic group, wherein a carbon number of $R^4$ is 1 to 12, or allyl group or a carboxyl group, X is a halogen compound of iodine, bromine or chlorine, p is an integer of 0 or 1.

[Formula 4]

$$L\text{-}(4\text{-}n)A \leq (4\text{-}p)B \leq 2L \quad (4)$$

wherein, L is the number of moles of the organolithium compound added to the polymerization initiation, A is the number of moles of added tin compound of the formula (1), B is the number of moles of added metal halide compound represented by the formula (3), n and p are integers appear in respective formula (1) and (3).

The third aspect of the present invention relates to silica containing rubber composition containing above explained modified solution polymerization diene rubber 20 phr or more of the total rubber component.

The Effect of the Present Invention

The present invention relates to a method for producing a modified solution polymerized diene rubber for blending of silica having excellent physical properties such as excellent strength and resilience and a rubber composition thereof. Desolvation is good, storage stability is excellent and workability is good.

BEST MODE FOR CARRYING OUT THE INVENTION

As the conjugated diene compound used in the present invention, 1,3-butadiene, isoprene, 1,3-pentadiene (piperylene), 2,3-dimethyl-1,3-butadiene, 1,3-hexadiene, etc. can be exemplified. Among these, because of the availability and from the viewpoint of the physical properties of the resulting modified solution polymerization diene rubber, 1,3-butadiene and isoprene are preferable. Especially 1,3-butadiene is preferable.

The used amount of the conjugated diene compound is generally 40 to 100 wt % of the total monomer, preferably 50 to 95 wt %. If less than 40 wt %, hysteresis loss increases. A the aromatic vinyl compound used in the present invention, styrene, α-methylstyrene, vinyl toluene, vinyl naphthalene, divinylbenzene, trivinylbenzene, and divinyl naphthalene can be exemplified. Among them, because of the availability and from the viewpoint of the physical properties of the resulting modified solution polymerization diene rubber, styrene is preferred.

The amount of the aromatic vinyl compound is usually 60 wt % or less in the total monomers, preferably 50 to 5 wt %.

As organolithium compounds used in the present invention is a lithium compound having 2 to 20 carbon atoms. For example, ethyl lithium, n-propyl lithium, iso-propyl lithium, n-butyl lithium, sec-butyl lithium, tert-butyl lithium, tert-octyl lithium, n-decyl lithium, phenyl lithium, 2-naphthyl lithium, 2-butyl-phenyl lithium, 4-phenyl-butyl lithium, cyclohexyl folithium, 4-cyclopentyl lithium, 1,4-dilithio-a butene-2 and the like. Preferable from industrial availability and stability, n-butyl lithium, sec-butyl lithium, tert-butyl lithium are preferable, and n-butyl lithium, sec-butyl lithium are more preferred.

The secondary amine compound used in the present invention is a compound represented by the formula (5) or (6).

[Formula 5]

$$R^5R^6N\text{—H} \quad (5)$$

[Formula 6]

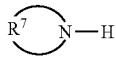

(6)

wherein, $R^5$, $R^6$ is an alkyl group having 1 to 20 carbons, a cycloalkyl group or an aralkyl group, $R^5$ and $R^6$ may be the same or different, and $R^7$ is divalent alkylene having 3 to 12 methylene groups, bicycloalkane, oxy- or amino-alkylene group.

As the $R^5$, $R^6$ of formula (5), for example, are methyl, ethyl, butyl, hexyl, octyl, cyclohexyl, 3-phenyl-1-propyl, isobutyl and the like. Specifically, methylethylamine, diethylamine, dibutylamine, ethylbutylamine, dihexylamine, dioctylamine, butyl octyl amine, octyl cyclohexylamine, diisobutylamine, butyl (3-phenyl-1-propyl) amine and the like. From industrial availability and solubility in a hydrocarbon solvent, dioctyl amine and dihexyl amine are preferred.

The $R^7$ groups of formula (6) comprises, for example, trimethylene, tetramethylene, hexamethylene, oxydiethylene, N-alkyl aza diethylene etc. Specific examples include pyrrolidine, piperidine, hexamethyleneimine or heptamethyleneimine and the like. Further, it may be 2 annular body such as decahydroisoquinoline or perhydroindole. In particular, pyrrolidine, piperidine, hexamethyleneimine or heptamethyleneimine are preferred.

As the monomers pre-polymerized in the existence of an organic lithium compound and a secondary amine compound, those of faster vulcanization rate than butadiene can be exemplified, specifically those are isoprene, 1,3-pentadiene (piperylene), and 2,3 dimethyl-1,3-butadiene. Isoprene is more preferable from the industrial availability and vulcanization rate.

As the tin compound represented by the formula (1), the following compounds may be mentioned specifically. For example, tin tetrachloride, ethyl tin trichloride, propyl tin trichloride, butyl tin trichloride, octyl tin trichloride, cyclohexyl tin trichloride, tin tetrabromide, ethyl tribromide tin, propyl tribromide tin, butyl three tin bromide, octyl tribromide tin, cyclohexyl tribromide, tin tetraiodide, tin, ethyl triiodide tin, propyl triiodide tin, butyl triiodide tin, octyl triiodide tin, cyclohexyl triiodide tin can be mentioned. Among them, preferred are tin tetrachloride, octyl tin trichloride, a tin tetrabromide. Particularly preferred is tin tetrachloride.

As the silane compound represented by the formula (2), the following compounds may be mentioned specifically. For example tetra-methoxysilane, tetra-ethoxysilane, tetrapropoxysilane, tetrabutoxysilane, tetraphenoxysilane, tetratolylsilane, methyltrimethoxysilane, methyltriethoxysilane, methyltripropoxysilane, methyltributoxysilane, methyltriphenoxysilane, ethyl trimethoxysilane, ethyl triethoxysilane, ethyl tripropoxysilane, ethyl tributoxysilane silane, ethyl triphenoxy silane, dimethyl dimethoxy silane, dimethyl diethoxy silane, dimethyl dipropoxy silane, dimethyl dibutoxy silane, dimethyl diphenoxy silane, diethyl dimethoxysilane, diethyl diethoxysilane, diethyl di-propoxysilane, diethyl dibutoxy silane, diethyl-diphenoxysilane, vinyltrimethoxysilane, vinyltriethoxysilane, vinyl tripropoxysilane, vinyl tributoxysilane silane, vinyl triphenoxy silane, vinyl tri (2-methoxyethoxy) silane, vinyl tri (methyl ethyl ketoxime) silane, methyl tri (methyl ethyl ketoxime) silane, methyl tris (diethyl ketoxime) silane, ethyl tri (methyl ethyl ketoxime) silane, ethyl tris(dimethyl ketoxime) silane, allyl triphenoxy silane, octenyl trimethoxysilane, phenyl trimethoxysilane, phenyl triethoxysilane, phenyl tripropoxy silane, phenyl tributoxy silane, phenyl triphenoxy silane, 2-(3,4-epoxycyclohexyl) ethyltrimethoxysilane, vinyl tri (methoxypropoxy) silane, methyl tris [2-(dimethylamino) ethoxy] silane, methyl tris [2-(diethylamino) ethoxy] silane, methyl tris [2-(dibutylamino) ethoxy] silane, ethyl tris [2-(dimethylamino) ethoxy] silane, ethyl tris [2-(diethylamino) ethoxy] silane, ethyl tris [2-(dibutylamino) ethoxy] silane, tetrakis [2-(dimethylamino) ethoxy] silane, tetrakis [2-(diethylamino) ethoxy] silane, tetrakis [2-(dibutylamino) ethoxy] silane and the like. Among these, preferred are ketoxime silanes, and those hydrolysis thereof is relatively easy: trimethoxy silanes, triethoxy silanes, tripropoxy silane silanes, and amino ethoxy silanes which are estimated to facilitate the reaction with the silica while increasing the storage stability of the modified polymerization diene rubber.

Specific examples of amino alkoxy silane compound are shown below. Dimethylamino methyltrimethoxysilane, 2-dimethylaminoethyl trimethoxysilane, 3-dimethylaminopropyl trimethoxysilane, 4-dimethylamino butyl trimethoxysilane, dimethylaminomethyl dimethoxy methyl silane, 2-dimethylaminoethyl dimethoxy methyl silane, 3-dimethylaminopropyl dimethoxymethylsilane, 4-dimethylaminobutyl dimethoxy methyl silane, dimethylamino methyltriethoxysilane, 2-dimethylaminoethyl triethoxysilane, 3-dimethylamino-propyltriethoxysilane, 3-diethylaminopropyl trimethoxysilane, 4-dimethylamino-butyl triethoxysilane, dimethylaminomethyldiethoxy methyl silane, 2-dimethylaminoethyl diethoxy-methyl silane, 3-dimethylaminopropyl diethoxymethylsilane, 4-dimethylamino-butyl diethoxymethylsilane, N-(3-triethoxysilylpropyl)-4,5-dihydroimidazole, N-allyl-aza-2,2 dimethoxy sila cyclopentane, and the like, and especially preferred are 3-dimethylamino-propyltriethoxysilane, 3-diethylaminopropyl triethoxysilane, 3-diethylamino-propyl trimethoxysilane.

As the alkoxysilane compound having a protecting group which becomes a primary amino group after hydrolysis, for example N,N-bis (trimethylsilyl)-3-aminopropyltrimethoxysilane, N, N-bis (trimethylsilyl)-3-aminopropyltrimethoxysilane, N, N-bis(trimethylsilyl)-3-aminopropyl tripropoxy silane, N, N-bis (trimethylsilyl)-2-aminoethyl trimethoxy silane, N, N-bis(trimethylsilyl)-2-aminoethyl methyldimethoxy silane and N, N-bis (trimethylsilyl) aminoethyl methyl diethoxy silane, 1-trimethylsilyl-2,2-dimethoxy-1-aza-2-silacyclopentane, N, N-diethyl-3-aminopropyl-trimethoxy silane, N, N-diethyl-3-aminopropyltriethoxy silane, 2-(triethoxysilylethyl) pyridine, γ-isocyanate propyl triethoxysilane and the like can be exemplified.

As the halogenated metal compound represented by the formula (3), the following compounds may be mentioned specifically.

For example, as the tin compound represented by the formula (1), tin tetrachloride, ethyl tin trichloride, propyl tin trichloride, butyl tin trichloride, octyl tin trichloride, cyclohexyl tin trichloride, tin tetrabromide, ethyl tin tribromide, propyl tin tribromide, butyl tin tribromide, octyl tin tribromide, cyclohexyl tin tribromide, tin tetraiodide, ethyl tin triiodide, propyl tin triiodide, butyl tin triiodide, octyl tin triiodide, and cyclohexyl tin triiodide can be exemplified. As the silicon compound, silicon tetrachloride, methyl silicon trichloride, ethyl silicon trichloride, propyl silicon trichloride, butyl silicon trichloride, octyl silicon trichloride, cyclohexyl silicon trichloride, silicon tetrabromide, methyl silicon tribromide, ethyl silicon tribromide, propyl silicon tribromide, butyl silicon tribromide, octyl silicon tribromide, cyclohexyl silicon tribromide, silicon tetraiodide, ethyl silicon triiodide, propyl silicon triiodide, butyl silicon triiodide, octyl silicon triiodide and cyclohexyl silicon triiodide can be exemplified. Among these, preferred are silicon tetrachloride, methyl silicon trichloride, ethyl silicon trichloride, tin tetrachloride, octyl tin trichloride. Particularly preferred are silicon tetrachloride, methyl silicon trichloride.

Conditions of usage of the raw material, such as the amount and the reaction temperature, reaction time for the production of the solution polymerization diene rubber are as follows.

For the solution polymerization of the diene rubber, commonly practiced method is used, that is: the conjugated diene compound or the aromatic vinyl compound are polymerized in the condition of temperature 10-120° C. for several tens of minutes to several hours, in the presence of an organic lithium compound and polar compounds such as an ether compound or an amine compound.

The amount of the organic lithium compound to be used, is usually better to be in the range of 0.1 to 10 millimoles per 100 g of diene rubber. When less than 0.1 millimol, molecular weight becomes too high, and MV viscosity and the solution viscosity become too high, which cause problems in rubber production processes and tire manufacturing processes. When it exceeds 10 millimol, the molecular weight of the diene rubber becomes too low, and vulcanizate properties is greatly reduced.

In the polymerization, as the ether compound for adjusting the microstructure, the vinyl content in particular, of the diene monomer portion of the diene rubber, such as diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, tetrahydrofuran (THF), 2,2-di (2-tetrahydrofuryl) propane (DTHFP), bis tetrahydrofurfuryl formal, tetrahydrofurfuryl alcohol methyl ether, tetrahydrofurfuryl alcohol ethyl ether, tetrahydrofurfuryl alcohol butyl ether, alpha-methoxy tetrahydrofurane, dimethoxybenzene, and dimethoxyethane are used.

As the amine compound, tertiary amines such as, triethylamine, pyridine, N, N, N', N'-tetramethylethylenediamine, dipiperidinoethane, N, N-diethylethanolamine methyl ether, N, N-diethylethanolamine ethyl ether, N, N-diethylethanolamine butyl ether are used.

As preferred compounds, considering the polymerization rate and the modification efficiency, tetrahydrofuran (THF), 2,2-di (2-tetrahydrofuryl) propane (DTHFP) and the like can be exemplified. The amount of the addition of these compounds is usually 0.01 to 10 mol, and preferably from 0.2 to 5 mol, per 1 mol of the organic lithium compound which includes such as a plurality of N atoms and O atoms. Compounds having one O atom in the molecule, such as tetrahydrofuran for solvent, are preferably added in an amount of 0.05 to 10%.

The polymerization reaction is carried out in a hydrocarbon solvent. Suitable hydrocarbon solvents is selected from aliphatic hydrocarbons, aromatic hydrocarbons, and alicyclic hydrocarbons, in particular propane having 3 to 12 carbon, n-butane, iso-butane, n-pentane, iso-pentane, n-hexane, cyclohexane, n-heptane, propene, 1-butene, iso-butene, trans-2-butene, cis-2-butene, 1-pentene. 2-pentene, 1-hexene, 2-hexene, benzene, toluene, xylene, ethylbenzene. Preferably, n-pentane, iso-pentane, n-hexane, cyclohexane, n-heptane. These solvents may be used by mixing two or more.

In the present invention, mainly conjugated diene compounds, or a conjugated diene compound and an aromatic vinyl compound are polymerized by anionic polymerization, then the active diene rubber is coupled with tin compounds, and then reacted by a silane compound. These modification reaction is usually, 0-120° C., preferably 50-100° C., the reaction time is 1-30 minutes, preferably 5-20 minutes.

As for the mode of the polymerization process used in the present invention, both batch polymerization process and continuous polymerization process are possible. The batch polymerization method is suitable for modified solution polymerization diene rubber having special features in resilience, and the continuous polymerization process is suitable for those having special features in wear resistance and workability.

In step ii), firstly, by adding a tin compound represented by the formula (1) into the active diene rubber before modification, a coupled diene rubber being tri- or more-functional with tin compounds is prepared. The ratio of 3 or more branch components of the diene rubber is preferably between 5-30%. When it is less than 5%, reactivity with carbon black, being usually used in combination with silica, is reduced, and in steam desolvation process and in drying step, crumbs (undried mass of the rubber having a few millimeters to several centimeters) stick each other so drying is difficult. When it exceeds 30%, the component that reacts with the silica decreases, and rubber vulcanizate property of the silica compounded is decreased. Thus, more preferred ratio of 3 branch component of the diene rubber is 10-25%. The specific case of tin tetrachloride is 0.0125-0.075 mole equivalents relative to the active diene rubber. More preferably from 0.0125-0.05 mole eq. The proportion of these branching structures can be measured by GPC.

In step iii), by adding a silane compound represented by the formula (2), two-branch structure of the diene rubber is made to be 30% or less. The amount of the silane compound used in said addition is, an amount corresponding to 0.8-2 times, more preferably 1.0-1.5 times, of the number of molecules per one remaining active diene rubber molecule in step ii). If it is less than 0.8, reactivity with the small number becomes silica alkoxysilyl group introduced into the active diene rubber is lowered. If it is more than twice, storage stability worsens.

However, the modified solution polymerization diene rubber, having the structure of a diene rubber added with one molecule of silane compound, causes a problem of being highly unstable, and rising of Mooney viscosity during storage. Therefore, in order to convert the structure to be being stable at the time of storage, and reactive at the time of rubber and silica reaction, drying is done after steam coagulation so as to increase the component of 2 or more branches by 10-50%.

According to the present invention, branch structure after steam coagulation and drying is estimated to be a two-branch structure -A, and to be stable during rubber storage and has high reactivity with silica when compounded. The 2 branch structure -A is estimated to have been produced by condensation reaction of (Rubber) —Si—OH which is made by hydrolyzing (Rubber) —Si—OR, and the (Rubber) —Si—OR is made by modification with a silane compound of formula (2). Reactivity with the conventional 2 branch structure —B and silica is low. Therefore, it is preferable to increase the proportion of 2 branch structure -A, this ratio is preferably 10 to 50%. When the ratio is less than 10%, Mooney viscosity stability during storage is poor, and when it is more than 50%, production condition is narrow and productivity is poor, therefore not economical. More preferable ratio is from 20 to 40%. 2 branch structure A (structure of the present invention):(Rubber) —Si—O—Si— (Rubber) 2 branch structure B (conventional structure): (Rubber) —Si— (Rubber) Ratio, etc.

The ratio of these branch structures are obtainable by GPC of the manufacturing process.

For further improvement of the storage stability and the drying step, in the present invention, firstly the coupling of the active diene rubber by tin compound of formula (1) is done in step ii), then after step ii) step iii) follows and therein a silane compound represented by the formula (2) and the active diene rubber are reacted under the condition that the component of the two branch structures is as little as possible. Further, before the steam coagulation and drying of step iv), a metal halide compound of the formula (3) may be added. The metal halide compound is added under the condition satisfying formula (4), for neutralizing what is deactivated by impurities contained in the solvent or monomer, or the lithium compound produced as a by-product in the reaction with the active diene rubber and the silane compound The amount of addition of the metal halide compound is L-(4-n) A≤(4-p) B≤2 L is preferred. More preferably from L-(4-n)A≤(4-p)B·1.5 L.

In case of L-(4-n)A>(4-p) B, neutralization is insufficient and workability during steam coagulation of modifier solution polymerization diene rubber, and storage stability are deteriorated. In case of (4-p) B>2 L, acidity becomes too strong, storage stability worsens, and causes such as metal corrosion problems.

The weight average molecular weight of the modified solution polymerized diene rubber obtained in the present invention is 100,000-1,000,000 as converted of polystyrene molecular weight, preferably 150,000-700,000.

If the weight average molecular weight is less than 100,000, the obtained rubber composition has insufficient strength, abrasion resistance, impact resilience, etc. On the other hand, when it exceeds 1,000,000, the processability is inferior and the dispersibility of the filler during kneading deteriorates and strength, abrasion resistance, impact resilience, etc. deteriorate.

Mooney viscosity (Abbreviated as MV, may be referred to measurement conditions are the ML 1+4/100° C.) of the modified solution polymerization diene rubber obtained in the present invention is preferably in the range of 20 to 150, if it is less than 20, abrasion resistance, rebound resilience is deteriorated, whereas, the workability is reduced if it is more than 150.

Vinyl content of the diene portion of the diene-based modified solution polymerization rubber of the present invention is generally varied in the range of 20-80%. In view of the vulcanization characteristics of the diene rubber, preferable range is 30 to 70%. Vinyl content in the case of emphasizing wear resistance is to be lower, the vinyl content is to be higher in the case of emphasizing braking performance on wet road surface.

Extender oil can be added to a polymerization reaction solution containing a modified solution polymerization diene rubber of the present invention. The extender oils of those commonly used in the rubber industry, such as paraffinic extender oil, aromatic extender oil, and naphthenic extender oil can be used.

Pour point of the extender oil is preferably between minus 20 and 50° C., more preferably minus 10 and 30° C. In this range, extended easily, the rubber composition having excellent tensile properties and low heat buildup of the balance is obtained. Suitable aromatic carbon content of extender oil (CA %, Kurtz analysis) is preferably 20% or more, more preferably 25% or more, and preferably paraffin carbon content of extender oil (CP %) is 55% or less, more preferably 45% or less. When CA % is too small, or CP % is too large, the tensile properties is insufficient. The content of polycyclic aromatic compounds in the extender oil is preferably less than 3%. The content is determined by IP346 method (testing method of The Institute Petroleum of UK.).

The content of the extender oil of the rubber composition is, for 100 parts by weight of the rubber composition, preferably 1 to 50 parts by weight, more preferably 5 to 30 parts by weight. When the content of the extender oil is in this range, the viscosity of the rubber composition containing silica becomes moderate, and tensile properties and low heat build is excellently well-balanced.

When using the modified solution polymerization diene rubber of the present invention as a rubber composition for a tire, it is possible to use, as far as within the range that does not essentially impair the effects of the present invention, natural rubber, isoprene rubber, butadiene rubber, and emulsion-polymerized styrene-butadiene rubber for blending, with a reinforcing agent, and various additives such as silica and/or carbon black, and after kneaded by a roll mill, a Banbury mixer, by adding a vulcanization accelerator, sulfur, etc. and the rubber can become a rubber for a tire such as a tread, a sidewall and a carcass. These compositions can also be used for belt, vibration-proof rubber and other industrial goods.

As a reinforcing material to be filled when the modified solution polymerization diene rubber of the present invention is used in a tire, especially in a tire tread, a filler having a hydroxyl group on the surface, such as silica or the like, is optimal. It is also possible to use a combination of carbon black. Filling amount of the filler relative to the total rubber component of 100 phr, is preferably 20-150 phr, more preferably 30-100 phr.

As silica, for example, dry silica, wet silica, colloidal silica, precipitated silica and the like can be used. Among these, wet silica composed mainly of hydrous silicic acid is particularly preferred. These silica may be used alone or in combination of two or more thereof. The particle size of the primary particles of the silica is not particularly limited, but 1-200 nm, more preferably 3-100 nm, particularly preferably 5-60 nm. With the particle size of the primary particles of silica is within this range, excellent tensile properties and low heat build-balanced are achieved. The particle size of the primary particles can be measured by an electron microscope or a specific surface area and the like.

It is preferable to blend a silane coupling agent into the rubber composition of the present invention in the rubber compounding, for the purpose of further improvement of tensile properties and low heat build-up. Examples of the silane coupling agents are: β-(3,4-epoxycyclohexyl) ethyltrimethoxysilane, N-(β-aminoethyl)-. γ-aminopropyltrimethoxysilane, tetrasulfide group such as bis (3-triethoxysilylpropyl) tetrasulfide, bis (3-triethoxysilylpropyl-isopropoxy) tetrasulfide, bis (3-tributoxysilylpropyl) tetrasulfide, γ-trimethoxysilylpropyl dimethylthiocarbamoyl tetrasulfide, γ-trimethoxysilylpropyl benzothiazyl tetrasulfide, and bis (3-triethoxysilylpropyl) disulfide, bis (3-tri-isopropoxy silyl propyl) disulfide, bis (3-tributoxysilyl propyl) disulfide, γ-trimethoxysilylpropyl dimethyl thiocarbamoyl disulfides, γ-trimethoxysilylpropyl benzothiazyl disulfide and the like.

Because to avoid scorch during kneading, silane coupling agent is preferably those sulfur contained in the molecule is 4 or less. More preferably sulfur is 2 or less. These silane coupling agents may be used alone or in combination of two or more.

The amount of the silane coupling agent with respect to 100 parts by weight of silica is, preferably 0.1 to 30 parts by weight, more preferably 1 to 20 parts by weight, particularly preferably 2 to 10 parts by weight.

As the carbon black, of the grade of N110, N220, N330, N440, N550, and the like can be used. Carbon blacks may be used alone or in combination of two or more thereof. The specific surface area of carbon black is not particularly limited, but a nitrogen absorption specific surface area (N 2 SA) is preferably 5-200 m$^2$/g, more preferably 50-150 m$^2$/g, particularly preferably 80-130 m$^2$. When the nitrogen adsorption specific surface area is within this range, more excellent tensile properties can be obtained. Further, DBP adsorption amount of carbon black is also not particularly limited, but it is preferably 5-300 ml/100 g, more preferably 50-200 ml/100 g, particularly preferably 80-160 ml/100 g. When DBP adsorption is within this range, a rubber composition having more excellent tensile properties are obtained. Further, as the carbon black, a high-structure carbon black, as disclosed in JP A H05-230290, which has specific surface area by the adsorption of cetyltrimethylammonium bromide is 110-170 m$^2$/g, DBP (24M4DBP) oil absorption under 4 times high pressure of 24,000 psi is 110-130 ml/100 g can be used and improves abrasion resistance of rubber compound.

The amount of carbon black is, per 100 parts by weight of the rubber component, 1-50 parts by weight, preferably 2 to 30 parts by weight, particularly preferably 3 to 20 parts by weight.

Incidentally, the rubber composition of the present invention, can use a vulcanizing agent, based on the total rubber components 100 phr, preferably in the range of 0.5-10 phr, more preferably 1-6 phr.

As the vulcanizing agent, typically sulfur, other sulfur-containing compounds and such as peroxides can be exemplified.

Further, vulcanization accelerators such as sulfenamide, guanidine and thiuram group may be used in conjunction with vulcanizing agent, at an amount according to the necessity. Furthermore, zinc white, vulcanization auxiliaries, antioxidants processing aids, and so on, may be used at an amount according to the necessity.

Further, various additives to the rubber composition obtained by using the modified solution polymerization diene rubber of the present invention is not particularly limited, but as the purpose of processability improver when kneading, or as further improving the balance of wet skid characteristics, rebound resilience, wear resistance, such as vulcanizing agent to be blended with other extender oil and conventional rubber composition, vulcanization accelerator, zinc white, antioxidant, scorch retarder, tackifier, and compatibilizers including epoxy group-containing compounds, carboxylic acid compounds, carboxylic acid ester compounds, ketone compounds, ether compounds, aldehyde compounds, organic compounds selected from hydroxyl group-containing compounds and amino group containing compound or alkoxysilane compounds, silicone compounds selected from siloxane compounds and aminosilane compound can also be added at the time of kneading.

Next, the present invention is further explanation in detail using embodiments, but the present invention is not limited by these examples. The physical properties of the polymers were measured according to the following methods.

Measurement of weight-average molecular weight (Mw) of the polymer was carried out by gel permeation chromatography "GPC; Tosoh HLC-8020, column: Tosoh GMHXL (2 in series)" using a differential refractive index (RI), weight-average molecular weight (Mw) was carried out in terms of polystyrene mono dispersed polystyrene as a standard. Coupling efficiencies shown in Table 1 and Table 2 (Cp), was calculated as follows. The "4 branch structure ($Cp^1$) by Sn compound" was determined using the tin tetrachloride, by the ratio of the peak area of the GPC chart molecular weight of the uncoupled diene rubber, and the peak area of corresponding coupled diene rubbers having approximately four times the molecular weight. The structure did not change substantially coupling efficiency even when steam coagulation is carried out.

The sample for "2 branch structure by Si compound ($Cp^2$)" is taken out as polymerization solution immediately after the silane compound-modification into a container sufficiently purged with nitrogen, and analyzed after dilution. It was determined as a percentage of the total peak area of the peak area of approximately twice the molecular weight before coupling GPC chart. Peak area corresponding to 3 branch structure by GPC chart after the silane compound modified under the conditions of the present invention were substantially negligible.

When "2 and more branch structure after steam coagulation ($Cp^3$)" is to be obtained, the increased 3 branch structure by steam coagulation of diene rubber modified with a silane compound overlaps with the coupling peak with tin compound. Therefore, we calculated from the ratio of 2 times or more of the peak area of the molecular weight prior to coupling. The "Increased coupling efficiency increase after steam coagulation ($\Delta Cp=Cp^3-Cp^1-Cp^2$)" is the difference in coupling efficiency before and after steam coagulation. Generally, storage stability increases as this value is larger.

The "Steam coagulation test" shown in Table 1 and Table 2 were carried out as follows, and determined by the following criteria: Steam coagulation was carried out by putting normal dispersant into a 50 L vessel equipped with a stirrer, and heated up to 90° C. with steam, and the polymerization solution 1 L is dropped from the container with a hole of 35 diameter 3 mm for the duration of 5 minutes, and stirred for 60 minutes, while always maintaining the 90° C. or higher. It was quantified according to the produced crumb form or the like into 1 to 5. The larger the number, the better.

5: Size of the crumb is homogeneous, crumbs do not adhere each other even continued stirring. (no big problem in industrial production is estimated)

3: Size of the crumb is slightly irregular, the adhesion amount of crumb increases as the stirring is continued. (problem in industrial production is likely, and some measures would be necessary)

1: crumbs are irregular, adhesion of the crumbs occurs immediately after the drop. (A big problem in industrial production will occur and production is impossible. Some major technical aid is indispensable.)

4,2: intermediate of the each.

Styrene unit content in the polymer was calculated from an integral ratio of $^1$H-NMR spectrum. The glass transition point of the polymer (Tg) was measured using a Perkin Elmer differential scanning calorimetry analyzer (DSC) 7 type apparatus, under the conditions of the temperature, raised at 10° C./min after cooling to −100° C.

Kneading properties, the physical properties of the vulcanized rubber were measured by the following method and Mooney viscosity of the rubber composition were measured in the following manner.

Kneaded for preparing vulcanizate of the rubber composition,—according to the JIS K6299: 2001 "rubber manufacturing method of the test sample". Kneading of the rubber composition containing no vulcanizing agent (A kneading) used Laboplastomill of Toyoseiki Co., Ltd. As the conditions, filling factor was about 65% (volume), rotor revolution was 50 rpm, starting temperature was 90° C. Kneading conditions (B kneading) of blending a vulcanizing agent to the rubber composition after A kneading was done by 8 inches roll of Daihan Co., Ltd., vulcanizer was blended at room temperature.

Temperature dispersion of viscoelasticity test was measured by a "TA INSTRUMENTS Ltd. viscoelasticity measuring apparatus RSA3", according to JIS K7244-7: 2007 "Plastics—Test method for dynamic mechanical properties—Part 7:—Non-resonance method torsional oscillation", the measurement frequency was 10 Hz, measuring temperature was minus 50 to 80° C., a dynamic strain of 0.1% at a rising temperature rate of 4° C./min, specimen size was the "width 5 mm×length 40 mm×thickness of 1 mm". the smaller tan δ (60° C.) means low exothermic.

(2) Tensile properties, e.g. strength at break (T B), the modulus, the elongation at break, the like was measured according to JIS K6251: 2004.

Abrasion resistance was measured according to JIS K6264-2: 2005 "Rubber, vulcanized or thermoplastic—wear resistance of Determination—Part 2: Test method" in Method B of Akron abrasion test, the wear of the vulcanized rubber composition was measured. The abrasion resistance was indicated by indices as abrasion resistance index, and that of the control sample is set as 100. The larger index the better.

Mooney viscosity was measured according to JIS K6300-2001. Mooney viscosity [ML 1+4 at 100° C.] was measured.

Mooney viscosity shown in Table 1 and Table 2 were calculated as follows. "MV after steam coagulation and drying MV (a)" is measured Mooney viscosity for a crumb obtained by steam coagulation at a temperature 110° C. of the roll, dried for 30 minutes. ". After a 130° C. roll mill MV (b)" is measured Mooney viscosity for the rubber by additionally milled the rubber at 130° C. for 20 minutes. After passing through 20 minutes Mooney viscosity was measured. "ΔMV" is the difference between the MVs measured as above, which means an increase of MV represented by (b-a), and smaller the value, the storage stability is better.

EXAMPLE

[Example 1] and [Comparative Example 1]

The autoclave of 10 L internal volume was thoroughly purged with dry nitrogen, cyclohexane 5500 g, were placed, 2,2-di (2-tetrahydrofuryl) propane 556 mg (3.02 mmol) (DTHFP), 200 g (1.92 mol) styrene, 760 g (14.05 mol) of 1,3-butadiene were placed in the autoclave. After adjusting the temperature in the autoclave to 25° C., the reaction mixture of n-butyl lithium 322 mg (5.03 mmol), isoprene 10 g and piperidine 428 mg (5.03 mmol) in cyclohexane was added to the autoclave, and the polymerization was initiated. Polymerization temperature adiabatically raised, the maximum temperature reached 88° C. At this point, 1,3-butadiene 30 g was added, and further 5 minutes polymerization carried out. Then added tin tetrachloride 52.4 mg (0.201 millimol), were reacted for 5 minutes. Here, 20 mL of polymerization solution was withdrawn from the autoclave into a vessel being sufficiently substituted by nitrogen, for analysis, and later the 20 mL solution was diluted and subjected to GPC analysis, and the rest was steam coagulated. Then the methyl-tris [2-(dimethylamino) ethoxy] silane 1.29 g (4.20 mmol) was added to the autoclave, subsequently reacted for 15 minutes. According to GPC analysis, the molar ratio of the active diene rubber and the silane compound was 1.3. Further added silicon tetrachloride 213 mg (1.26 mmol) and reacted for 5 minutes. Finally, 2,6-di-tert-butyl-p-cresol was added to the polymerization solution. The polymerization solution of 3000 g was dried by direct desolvation method. This rubber was (Comparative Example 1). The remaining solution was desolvated by steam coagulation method, and dried at 110° C. by the roll. This rubber was (Example 1). The results of GPC analysis and the results of an analysis of the styrene content of the diene rubber and vinyl content are summarized in Table 1. Although the difference between Example 1 and Comparative Example 1 is drying method, direct desolvation drying method of Comparative is Example 1 shows a major difference in storage stability, and it is big problem for industrial production.

Comparative Example 2

Except for adding 163 mg of tin tetrachloride, which is equivalent to half an equivalent of n-butyl lithium used as the polymerization initiator, the preparation of modified solution polymerization diene rubber was carried out same as in Example 1. The analytical results are summarized in Table 1. The 4 branch structure by Sn compound has increased approximately 3-times as Example 1.

Example 2

Except that isoprene was ruled out from the preliminary polymerization, the modified solution polymerization diene rubber was prepared all the same as in Example 1. The analytical results are summarized in Table 1. No particular big difference is seen relating to production.

Comparative Example 3

Except that tin tetrachloride coupling was ruled out from Example 1, example 3 was prepared in the same manner as in the modified solution polymerization diene rubber as in Example 1. The analytical results are summarized in Table 1. Crumb adhesion of each other in the steam coagulation tests are observed, is a big problem for industrial production.

Example 3

Except that the isoprene was ruled out from the preliminary polymerization and the addition of silicon tetrachloride was also ruled out, sample was prepared in the same manner as in the modified solution polymerization diene rubber as in Example 1. The analytical results are summarized in Table 1. Although steam coagulation test was slightly bad for the preparation, otherwise, no significant difference was observed.

TABLE 1

Table 1 Polymerization recipe and analytical results

| | Dimension | Example 1 | Comparative Example 1 | Comparative Example 2 | Example 2 | Comparative Example 2 | Example 3 |
|---|---|---|---|---|---|---|---|
| Styrene | g | 200 | 200 | 200 | 200 | 200 | 200 |
| Butadiene-1 | g | 760 | 760 | 760 | 760 | 760 | 760 |
| Butadiene-2 | g | 30 | 30 | 30 | 40 | 30 | 40 |
| Isoprene | g | 10 | 10 | 10 | 0 | 10 | 0 |
| Piperylene | mg | 428 | 428 | 428 | 428 | 428 | 428 |
| n-ButylLithium | mg | 322 | 322 | 322 | 322 | 322 | 322 |
| SnCl4 | mg | 52.4 | 52.4 | 163 | 52.4 | 0 | 52.4 |
| Methyl-tris(2-dimethyl amino)ethoxy silane | g | 1.29 | 1.29 | 1.29 | 1.29 | 1.61 | 1.29 |
| SiCl4 | mg | 213 | 213 | 213 | 213 | 213 | 0 |
| Desolvation method | | Steam coagulation | Direct desolvation | | Steam coagulation | | |
| Steam coagulation result | | 5 | n.d. | 5 | 5 | 2 | 4 |
| Styrene content | % | 20 | 20 | 20 | 20 | 20 | 20 |
| Vinyl content | % | 61 | 61 | 59 | 62 | 59 | 60 |
| Coupling efficiency | | | | | | | |
| 4 Branched structure with tin compound ($Cp^1$) | % | 21 | 21 | 62 | 18 | 0 | 22 |
| 2 and more branched structure with silicone compound($Cp^2$) | % | 22 | 22 | 5 | 25 | 25 | 28 |
| 2 and more branched structure after steam coagulation ($Cp^3$) | % | 78 | n.d. | 75 | 76 | 68 | 71 |
| Increased coupling efficiency after steam coagulation $\Delta Cp$ ($Cp^3 - Cp^1 - Cp^2$) | % | 35 | n.d. | 8 | 33 | 43 | 21 |
| MV after steam coagulation and dried (a) | | 83 | 38 | 71 | 79 | 72 | 77 |
| MV after treated by 130° C. roll mill(b) | | 85 | 89 | 75 | 83 | 85 | 85 |
| $\Delta$ MV; (b − a) | | 2 | 51 | 4 | 4 | 13 | 8 |

Example 4

Internal volume 10 L autoclave was sufficiently replaced with dry nitrogen, and were added cyclohexane 5500 g, tetrahydrofuran 154 g (THF), styrene 200 g (1.92 mol), 1,3-butadiene 760 g (14.05 mol). After adjusting the temperature in the autoclave to 25° C., piperidine 428 mg (5.03 millimol), and n-butyllithium 322 mg (5.03 millimol) was added sequentially and directly into autoclave to initiate polymerization. Polymerization adiabatically raised the temperature and the maximum temperature reached 91° C. At this point, added the 1,3-butadiene 40 g, and the polymerization was carried out for further 5 minutes. Then added tin tetrachloride 52.4 mg (0.201 millimol) and were reacted for 5 minutes. Here, 20 mL of polymerization solution was withdrawn from the autoclave into a vessel sufficiently substituted by nitrogen for analysis, and later diluted and GPC analysis was done, and the rest was steam coagulated. Subsequently methyltriethoxysilane 0.861 g (4.83 millimol) has added in autoclave and reacted for 15 minutes. According to GPC analysis, the molar ratio of the active diene rubber and the silane compound was 1.5. Further, silicon tetrachloride 213 mg (1.26 milllimol) was added and reacted for 5 minutes. Finally, 2,6-di-tert-butyl-p-cresol was added to the polymerization solution. The solution was desolvated by steam coagulation method and dried with the roll at 110° C. This rubber was Example 4. The results of the analysis are summarized in Table 2.

Example 5

Except for increasing amounts of styrene into 250 g, decreasing amount of the initial 1,3-butadiene into 710 g, without using piperidine, modified solution polymerization diene rubber sample was prepared all the same as in Example 4. The analysis results are summarized in Table 2. No big difference is seen in relation to production.

Example 6

Except for equimolar (N, N-dimethyl-3-aminopropyl) triethoxy silan instead of methyl triethoxysilane, modified solution polymerization diene rubber was prepared all the same as in Example 4. The analysis results are summarized in Table 2. No big difference is seen in relation to production.

Example 7

Except for the non-existence of the silicon tetrachloride addition after the silane compound addition, a modified solution polymerization diene rubber sample was prepared all the same as in Example 6. The analysis results are summarized in Table 2. Steam coagulation test has become a little worse, but the big difference is not seen in relation to other aspects of production.

Comparative Example 4

Except for no use of tin tetrachloride after polymerization, no use of piperidine as polymerization initiator component and no use of silicon tetrachloride after the addition of the silane compound, modified solution polymerization diene rubber sample was prepared all the same as Example 6. The analysis results are summarized in Table 2. Steam coagulation test becomes poor, and storage stability was also greatly deteriorated.

TABLE 2

Table 2 Polymerization recipe and analytical results

| | Dimension | Example 4 | Example 5 | Example 6 | Example 7 | Comparative Example 4 |
|---|---|---|---|---|---|---|
| Styrene | g | 200 | 250 | 200 | 200 | 200 |
| Butadiene-1 | g | 760 | 710 | 760 | 760 | 760 |
| Butadiene-2 | g | 40 | 40 | 40 | 40 | 40 |
| Isoprene | g | 0 | 0 | 0 | 0 | 0 |
| Piperylene | mg | 428 | 0 | 428 | 428 | 0 |
| n-ButylLithium | mg | 322 | 322 | 322 | 322 | 322 |
| SnCl4 | mg | 52.4 | 52.4 | 52.4 | 52.4 | 0 |
| Silane compound | | Methy triethoxy silane | | (N,N-Dimethyl-3-amino propyle)triethoxy silane | | |
| Amount of silane compound | g | 0.861 | 0.749 | 1.05 | 1.05 | 1.05 |
| SiCl4 | mg | 213 | 213 | 213 | 0 | 0 |
| Desolvation method | | Steam coagulation | | | | |
| Steam coagulation result | | 5 | 5 | 5 | 4 | 2 |
| Styrene content | % | 20 | 25 | 20 | 20 | 21 |
| Vinyl content | % | 61 | 59 | 62 | 60 | 59 |
| Coupling efficiency | | | | | | |
| 4 Branched structure with tin compound ($Cp^1$) | % | 21 | 25 | 22 | 23 | 0 |
| 2 and more branched structure with silicone compound($Cp^2$) | % | 22 | 23 | 25 | 28 | 25 |
| 2 and more branched structure after steam coagulation ($Cp^3$) | % | 80 | 77 | 70 | 71 | 61 |
| Increased coupling efficiency after steam coagulation $\Delta Cp$ ($Cp^3 - Cp^1 - Cp^2$) | % | 37 | 29 | 23 | 20 | 36 |
| MV after steam coagulation and dried (a) | | 85 | 78 | 76 | 72 | 56 |
| MV after treated by 130° C. roll mill(b) | | 86 | 82 | 78 | 79 | 78 |
| $\Delta$ MV; (b − a) | | 1 | 4 | 2 | 7 | 22 |

Examples 8-14 and Comparative Examples 5-7

The modified solution polymerization diene rubber prototyped in Comparative Examples 2 to 4 and Examples 1 to 7 were formulated according to vulcanizate formulations of Table 3, and vulcanizate properties were evaluated. Evaluation results are shown in Table 4. Comparative Example 1 is very poor in storage stability, and therefore omitted from property evaluation because there is a low possibility of industrial use. In table 4, formation MV, Tensile Strength, elongation at break, indicated modulus ratio M 300/M 100, Akron abrasion resistance and the dynamic viscoelasticity test results are shown. Physical properties are represented as index of Comparative Example 5 as 100. For all items, larger index shows better physical properties. Larger modulus ratio which is a measure of the reinforcinforng properties, and lower compound MV are better. While Comparative Example 5 has a low compound MV, modulus ratio is small, and therefore considered as less reinforcing of silica, and is not good in vulcanizate properties. Tensile strength shows larger value as reinforcement with the silica is higher, and a large Tensile strength value has a high correlation between Akron abrasion resistance.

Tan δ index (0° C.) is primarily governed by the styrene content and the vinyl structure of diene rubber, and significant differences was not found in any diene rubber prototypes of the present invention. Tan δ index (60° C.) is influenced by dispersibility of silica and reinforcing by silica. High reinforcing property and better dispersibility lead to exhibit a larger value. From these physical property evaluation results and the like, modified solution polymerization diene rubber of the present invention is good in the productivity, has high storage stability, yet has good vulcanizate properties.

TABLE 3

Table 3 Recipe of valcanized rubber compound

| Recipe | | phr |
|---|---|---|
| Rubber | | 100 |
| Silica | | 70 |
| Silane coupling agent | Si69 | 6 |
| Polyethylene glycol | PEG4000 | 4 |
| Carbon black | N339 | 4 |
| Aromatic oil | | 10 |
| Zinc oxide | | 3 |
| Stearic acid | | 2 |
| Antioxidant | 6C | 1 |
| Vulcanization accelerator | D | 0.5 |
| Vulcanization accelerator | CZ | 2.5 |
| Sulfur | | 1.5 |
| Total | | 204.5 |

Cf-1) phr; parts per hundred rubber.

Cf-2) Si69; bis(3-triethoxysilylpropyl) tetrasulfide

Cf-3) PEG4000; polyethylene glycol 4000

Cf-4) 6C; N-phenyl-N'-(1,3-dimethylbutyl)-p-phenyldiamine

Cf-5) D; N,N'-diphenylguanidine

Cf-6) CZ; N-cyclohexyl-2-benzothiazolylsulfenamide

TABLE 4

| | | Example 8 | Example 9 | Example 10 | Example 11 | Example 12 | Example 13 |
|---|---|---|---|---|---|---|---|
| | | | | Modified rubbe sample | | | |
| | | Example 1 | Example 2 | Example 3 | Example 4 | Example 5 | Example 6 |
| Compound MV ($ML_{1+4/100° C.}$) | | 75 | 77 | 74 | 71 | 68 | 70 |
| Tencile strength at break ($T_B$) | MPa | 24.6 | 22.6 | 21.5 | 22.1 | 24.9 | 23.1 |
| Elongation at break ($E_B$) | % | 430 | 410 | 420 | 390 | 380 | 415 |
| Modulus ratio ($M_{300}/M_{100}$) | | 5.2 | 4.8 | 4.7 | 4.5 | 5 | 4.8 |
| Acron abrasion | Index | 165 | 152 | 148 | 150 | 159 | 156 |
| Dynamic viscosity test | | | | | | | |
| tan δ (0° C.) | Index | 105 | 103 | 104 | 102 | 110 | 103 |
| tan δ (60° C.) | Index | 163 | 150 | 147 | 145 | 141 | 149 |

| | | Example 14 | Comparative Example 5 | Comparative Example 6 | Comparative Example 7 |
|---|---|---|---|---|---|
| | | | | Modified rubbe sample | |
| | | Example 7 | Comparative Example 2 | Comparative Example 3 | Comparative Example 4 |
| Compound MV ($ML_{1+4/100° C.}$) | | 69 | 61 | 80 | 84 |
| Tencile strength at break ($T_B$) | MPa | 21.9 | 15.3 | 19.2 | 18.8 |
| Elongation at break ($E_B$) | % | 420 | 520 | 480 | 455 |
| Modulus ratio ($M_{300}/M_{100}$) | | 4.6 | 2.5 | 4 | 3.8 |
| Acron abrasion | Index | 145 | 100 | 140 | 135 |
| Dynamic viscosity test | | | | | |
| tan δ (0° C.) | Index | 105 | 100 | 101 | 102 |
| tan δ (60° C.) | Index | 138 | 100 | 131 | 125 |

The invention claimed is:

1. A method for producing a modified solution polymerized diene rubber, comprising:
   i) initiating polymerization of a conjugated diene compound and an aromatic vinyl compound in a hydrocarbon by an organolithium compound or in the co-presence of a secondary amine compound;
   ii) after completion of the polymerization, adding a tin compound of formula (1) to treat the diene rubber so that the content of three or more branched component is 5 to 30%;
   iii) adding the silane compound of formula (2), whereby the content of two-branched component of the diene rubber is less than 30%; and
   iv) steam coagulating and drying the obtained polymer composition, so that the content of two or more branched component increases by 10 to 50% with respect to the state before steam coagulation, and wherein the modified solution polymerized diene rubber is thermally stabilized to the extent that the Mooney viscosity (a) of the rubber measured after said coagulation and drying, varies by not more than 10 from the Mooney viscosity (b) of the rubber measured when it is further heat-treated for 20 minutes with a subsequent 130° C. roll mill,

[Formula 1]

$(R^1)_n-Sn-(X)_{4-n}$   Formula (1)

wherein $R^1$ is an alkyl group, an allyl group or aromatic group, wherein a carbon number of $R^1$ is 1 to 12 carbon atoms, X is a halogen compound of iodine, bromine or chlorine, n is an integer of 0 or 1,

[Formula 2]

$(R^2O)_n-Si-(R^3)_{4-m}$   Formula (2)

wherein $R^2$ is an alkyl group, an allyl group or an aromatic group, wherein a carbon number of $R^2$ is 1 to 12, or an alkyl group, an aromatic group or an allyl group containing a nitrogen atom in these functional groups, $R^3$ is a an alkyl group, an allyl group or aromatic group, wherein a carbon number of $R^3$ is 1-12, or an alkyl group, an aromatic group or allyl group, containing an oxygen atom and/or a nitrogen atom in these functional groups, m is an integer of 2 to 4.

2. The method for producing a modified solution polymerized diene rubber according to claim 1, wherein polymerization is initiated in the presence of an organolithium compound and a secondary amine compound.

3. The method for producing a modified solution polymerized diene rubber according to claim 1, wherein, after preliminarily polymerizing isoprene with an organolithium compound, another conjugated diene compound and an aromatic vinyl compound are polymerized.

4. The method for producing a modified solution polymerization diene rubber according to claim 1, wherein another conjugated diene compound and the aromatic vinyl compound are polymerized after preliminary polymerization in the presence of an organolithium compound, a secondary amine compound, and isoprene.

5. The method for producing a modified solution polymerized diene rubber according to claim 1, wherein steam coagulation and drying in the step iv) is performed in such a way that the content of two or more branched component increases by 20 to 40% with respect to the state before the steam coagulation and drying.

6. The method for producing the modified solution polymerization diene rubber according to claim 1, wherein, after preliminarily polymerizing isoprene of not more than 10% by weight of the total monomers with an organolithium compound, another conjugated diene compound and the aromatic vinyl compound are polymerized.

7. The method for producing the modified solution polymerized diene rubber according to claim 1, wherein after step iii) and before step iv), addition of the metal halide compound of formula (3) in an amount satisfying the condition of formula (4) is done, and then the steam coagulation and drying of step iv) is performed,

[Formula 3]

$$(R^4)_p\text{-}M\text{-}(X)_{4-p} \qquad \text{Formula (3)}$$

wherein, M is a tin atom or a silicon atom, $R^4$ is an alkyl group or aromatic group, wherein a carbon number of $R^4$ is 1 to 12, or an allyl group or a carboxy group, X is a halogen compound of iodine, bromine or chlorine, p is an integer of 0 or 1,

[Formula 4]

$$L\text{-}(4\text{-}n)A \leq (4\text{-}p)B \leq 2L \qquad \text{Formula (4)}$$

wherein, L is the amount of moles of the organolithium compound added at the starting of the polymerization, A is the amount of moles of the added tin compound of formula (1), B is the added halogenated metal compound of formula (3), and n and p are integers shown in formulae (1) and (3), respectively.

8. A rubber composition prepared by the method according to claim 1, comprising silica of at least 20-150 phr for 100 phr of the total rubber component, wherein said 100 phr of the total rubber component contains at least 20 phr of the modified solution polymerized diene rubber.

9. A rubber composition prepared by the method according to claim 1, comprising silica of at least 20-150 phr and carbon black of 5-30 phr for 100 phr of an entire rubber component, wherein said 100 phr of the total rubber component contains at least 20 phr of the modified solution polymerized diene rubber according to claim 1.

* * * * *

UNITED STATES PATENT AND TRADEMARK OFFICE
CERTIFICATE OF CORRECTION

PATENT NO. : 10,428,161 B2
APPLICATION NO. : 15/760703
DATED : October 1, 2019
INVENTOR(S) : Iwakazu Hattori et al.

It is certified that error appears in the above-identified patent and that said Letters Patent is hereby corrected as shown below:

On the Title Page

The Assignee section should read:
(73) Assignee: ETIC Inc., Tokyo (JP)

In the Specification

Column 3, Line 67, should read:
$(R^2O)_m\text{-Si-}(R^3)_{4-m}$     Formula (2)

Column 11, Line 24, should read:
$L\text{-}(4\text{-}n)A \leqq (4\text{-}p)B \leqq 1.5\ L$ In the Claims Claim 1, at Column 21, Line 67, should read:
$(R^2O)_m\text{-Si-}(R^3)_{4-m}$     Formula (2)

Signed and Sealed this
Fourth Day of February, 2020

Andrei Iancu
*Director of the United States Patent and Trademark Office*